UNITED STATES PATENT OFFICE.

GIDEON E. MOORE, OF NEW YORK, N. Y.

MANUFACTURE OF HYDROGEN.

SPECIFICATION forming part of Letters Patent No. 314,342, dated March 24, 1885.

Application filed August 21, 1884. (No specimens.)

*To all whom it may concern:*

Be it known that I, GIDEON E. MOORE, a citizen of the United States, residing at New York, in the county and State of New York, have invented new and useful Improvements in the Manufacture of Hydrogen Gas and other Substances, of which the following is a specification.

When bituminous coal or petroleum or petroleum residue or organic substances containing or chiefly consisting of hydrogen and carbon are subjected to destructive distillation, or when they or other substances—such as anthracite coal, coke, or charcoal—consisting chiefly of carbon are subjected to the action of highly-heated steam, the volatile or gaseous products obtained contain, besides hydrogen, a greater or smaller proportion of carbon compounds—such as carbonic oxide and gaseous or liquid hydrocarbons or hydrocarbon vapors.

The object of my invention is to remove the carbon compounds contained in the products obtained as above stated, leaving hydrogen gas of a high degree of purity, and adapted to the various applications for which that substance may be used.

The first part of my invention relates to the conversion of the said carbon into carbonic acid by the action of steam, at a suitable temperature, in contact with certain substances hereinafter specified, which substances promote and facilitate the action of the steam and permit the operation to be conducted with greater rapidity and at a lower temperature than would be practicable by any means heretofore proposed. During this operation the hydrogen of the steam is liberated in the free state, and is added to that originally present in or resulting from the products on which the steam acts.

The second part of my invention relates to the removal of the carbonic-acid gas from the mixture of hydrogen and carbonic-acid gases formed by the action of steam in contact with the substances hereinafter specified, and the products on which the steam acts.

In carrying out my invention I proceed as follows: I take any gas containing hydrogen and carbonic oxide, or hydrocarbon gases or vapors; or I take vaporized hydrocarbons or liquid hydrocarbons, or any substances containing hydrogen and carbon—such as water-gas or the gas obtained by destructive distillation, with or without the aid of steam, from coal, petroleum, petroleum residues, or organic substances generally, or by the action of steam on these substances, or these substances themselves either reduced to spray or vapor or melted or otherwise suitably divided—and bring the same in contact with metallic iron, manganese, copper, lead, tin, or zinc, or with the oxides of these metals, or with mixtures containing these metals or their oxides, in a vessel or receptacle of any suitable form or size or material—such as a tube, chamber, retort, or other vessel—and previously heated, if required, to such temperature as may be necessary for the action to be obtained—for example, a temperature ranging from incipient redness to a white heat. For instance, when iron or oxide of iron is used, a heat ranging from medium redness to a high red will usually be found suitable. During the time when the substances to be acted on are in contact with the metal or oxide I cause steam to enter the vessel and to mix with the substances therein, or I may cause steam to mix with the hydrocarbon substances to be acted on before they enter the vessel containing the metal before specified, or the oxide thereof. In general it is preferable to heat the steam to, or nearly to, a red heat before it enters the vessel containing the hydrocarbon substances and the metal or oxide, so as to avoid unduly cooling the latter; but this is not in all cases essential to its action. In practice it is preferable to use an excess of steam over and above what is required to completely transform the carbon into carbonic acid, so that undecomposed steam may be present in the gases produced; but in all cases it is requisite to employ a sufficient quantity of steam to burn up all the carbon, as hereinafter explained. The gases or vapors or other substances to be acted upon may also, if required, be previous to being brought in contact with metal or oxide, heated to any suitable temperature. When metals—such, for instance, as metallic iron—are used, it is preferable to admit steam until the metal is more or less oxidized before introducing the carbon compounds. When the carbon compounds are brought into contact with steam and the metal or oxide hereinbefore specified at proper temperatures, as above specified, the steam and the carbon compounds react upon each other, carbonic acid is formed and hydrogen is liberated. Thus if water-gas, which consists of a mixture of hydrogen, carbonic oxide, and marsh-gas with some carbonic acid and nitrogen, is the material to be acted upon the reactions which take place may be expressed by the following equations, viz: first, $CO + H_2O = CO_2 + 2H$, and, second, $CH_4 + 2H_2O = CO_2 + 8H$.

The action of the metal or metallic oxide I believe to be that of a carrier of oxygen from the steam to the carbon compound, whereby the steam is caused to oxidize all the carbon of carbonaceous gases, vapors, &c., the process being aided and sustained by the "catalyzing" effect of the metal or oxide employed. Thus while oxide of iron is reduced by hydrogen at a red heat to metal, it is again oxidized by steam to oxide, so that in the presence of a mixture of steam and hydrogen the oxide will remain unchanged; but in the presence of steam and of carbonic oxide or other carbon compounds, with the exception of carbonic acid at a proper temperature, the metal is first oxidized by the decomposition of the steam, and then the metallic oxide is reduced to metal, or to a lower state of oxidation, the oxygen which is liberated serving to burn the carbon to carbonic acid, while the reduced metal, as it serves to decompose the steam, is immediately reoxidized, so that the metal acts as a carrier to transfer the oxygen taken from the steam to the carbon, until all the carbon present has been converted into carbonic acid, the final products being essentially carbonic acid and hydrogen. In order to reach this result, a sufficient quantity of steam must be used to burn up all the carbon present.

When the compound containing the carbon to be eliminated is a gas, and in cases where the mode of generation will permit, I may bring the gas in contact with the metal or oxide in the chamber or vessel in which the gas is generated, or in a compartment of the said generating-vessel, instead of using a separate chamber or vessel; or I may even bring the gas at the moment of its generation into contact with the steam and metal or metallic oxide.

I have in the foregoing description used the terms "metallic iron," "manganese," "copper," "lead," "tin," or "zinc;" but I desire it to be understood that, when either of these metals is placed in the gas-treating chamber in its natural state, it must first be oxidized by the action of the steam before it will begin to act in the manner necessary to the carrying out of my process. The terms "metallic oxide" or "oxidized metal" can therefore be used to define the substances employed in my process.

After converting the carbon in the substances operated upon into carbonic acid, as above described and set forth, I subject the gas to any convenient treatment to remove the carbonic acid it contains. Thus I may treat it with lime, as in the usual process of purification of coal-gas; or I may pass it through any suitable form of apparatus containing carbonate of soda or carbonate of potassa, or solutions which, under the action of the said gas may yield carbonate or bicarbonate of soda or potassa, which may be utilized for their commercial applications; or I may cause the gas to come in contact with a solution of carbonate of soda or carbonate of potassa, so as to form a solution of bicarbonate of the base, from which more or less of the carbonic acid may be driven off by heat subsequently and utilized for its various applications, if required, while the solution, after being cooled, may again be used for the purification of a fresh quantity of the gas. In this latter form of purification I prefer to use a continuous process, by means of which the solution of carbonate of soda or potassa is made to circulate first through the apparatus through which the gas to be purified passes, wherein by spraying the solution, causing the gas to bubble through or to pass over it, or other well-known devices, the gas is brought into intimate contact with the solution. The solution then passes through a heating apparatus of any known construction in which the carbonic acid, or more or less of it, is expelled, and from which it may be conducted by suitable pipes to apparatus in which it may be utilized. After passing through the heating apparatus the solution is cooled by any known device, and is finally returned to the vessel containing the gas to be purified; or I bring the gases, after cooling them, into intimate contact with water under pressure, preferably in a vessel or series of vessels, through which a current of water can be made to pass in a direction opposed to that in which the gas passes. The water is thus made to absorb a large proportion of the carbonic acid contained in the gas, and the remaining portion may be removed by any of the means above described and set forth. After being charged with carbonic acid, the water or solution of carbonate of potassa or soda may be used to cool fresh portions of the gas by conducting the gas through pipes around the outside of which the said water or solution circulates. During this operation the water or solution becomes freed from the carbonic acid it previously contained, or more or less of it, and may, after being cooled, be again used to absorb carbonic acid from a fresh portion of gas. The carbonic acid evolved from the water or solution during its use in cooling the gas may be conveyed away by suitable pipes and used for purposes to which it may be applied.

After removing the carbonic acid by the means above described the residual gas will, if the operation be properly performed, be found to be chiefly hydrogen gas and adapted to the various industrial applications of that substance; or it may be charged with illuminating gases or vapors or subjected to any desired treatment for communicating to it the properties of an illuminating-gas.

I am aware that an olefiant gas has been produced from benzole or naphtha and water in conjunction with zinc, by preheating the former substances, so as to form vapors, and bringing said vapors into contact with a certain quantity of metallic zinc heated to the required degree. Such process forms no part of my invention, since it involves the use of zinc or its equivalent to reduce water, the action being limited by the use of definite proportions, and the hydrogen evolved being made to combine with carbon to form an illuminating-gas containing much acetylene. In my process, on the contrary, an excess or a sufficient quantity of steam is used to oxidize all the carbon of carbonaceous gases, vapors, &c, the action being sustained by the catalyzing effect of various metallic oxides or metals previously oxidized, the product being a gas consisting of carbonic acid and hydrogen, from which the carbonic acid is subsequently eliminated by either of the processes herein set forth. In the prior process referred to the metals employed are, after their oxidation, unfit for further use, since they will no longer evolve hydrogen with steam, and the entire process is purely one of reduction, the hydrogen of the water decomposed being the active agent in bringing about the required change. In my process only a metallic oxide will answer, because when metals are used they must be oxidized before they begin to act, and the process, which is continuous, is purely one of oxidation at the expense of the oxygen of the water.

I am aware of the English Patents No. 2,719, dated October 21, 1865, and No. 1,471, dated April 23, 1873, granted to Johann Baggs, and which relate to the alternate treatment of metallic iron with steam and carbonic oxide at high temperatures, and the separate collection of the gaseous products thus obtained, and do not claim the processes therein described.

What I claim as new, and desire to secure by Letters Patent, is—

1. The process of transforming gases, vapors, or substances containing carbon or carbon compounds into mixtures of gases composed, essentially, of carbonic acid and hydrogen, which consists in the continuous introduction of such gases or vapors, together with an excess of steam, into a chamber containing a metallic oxide or oxidized metal, substantially as described.

2. The process of manufacturing hydrogen gas, consisting in the continuous introduction of gases, vapors, or substances containing carbon or carbon compounds, simultaneously along with steam, into a chamber containing a metallic oxide or oxidized metal, followed by a treatment of the gaseous products thereby obtained with lime or the carbonates of potassa or soda, or solutions thereof, or solutions in which these substances may be formed under the action of the said gaseous products, or with water for eliminating the carbonic acid they contain, substantially as described.

3. The herein-described process, consisting in the continuous introduction of gases, vapors, or substances containing carbon, simultaneously along with steam, into a chamber containing a metallic oxide or oxidized metal, passing the mixture of hydrogen and carbonic acid resulting from said treatment over, through, or in contact with the carbonate of potassa or soda, or solutions of said carbonates, or solutions in which these substances may be formed under the action of said mixture of gases, and eliminating and utilizing the by-products, bicarbonate of soda or potassa, and carbonic acid resulting from said process, substantially as described.

In testimony whereof I have hereunto set my hand and seal in the presence of two subscribing witnesses.

GIDEON E. MOORE. [L. S.]

Witnesses:
E. F. KASTENHUBER,
A. FABER DU FAUR, Jr.